United States Patent
Nelson, Jr.

(10) Patent No.: US 10,986,823 B2
(45) Date of Patent: *Apr. 27, 2021

(54) SELF DISPENSING BAIT HOLDER

(71) Applicant: Baitanator, Inc., Lamesa, TX (US)

(72) Inventor: Mackie Nelson, Jr., Lamesa, TX (US)

(73) Assignee: BAITANATOR, INC., Lamesa, TX (US)

( * ) Notice: Subject to any disclaimer, the term of this patent is extended or adjusted under 35 U.S.C. 154(b) by 412 days.

This patent is subject to a terminal disclaimer.

(21) Appl. No.: 15/834,992

(22) Filed: Dec. 7, 2017

(65) Prior Publication Data

US 2018/0103622 A1 Apr. 19, 2018

Related U.S. Application Data

(63) Continuation-in-part of application No. 14/349,177, filed as application No. PCT/US2012/055080 on Sep. 13, 2012, now Pat. No. 9,839,209.

(60) Provisional application No. 61/542,450, filed on Oct. 3, 2011.

(51) Int. Cl.
*A01K 83/06* (2006.01)
*A01K 91/06* (2006.01)

(52) U.S. Cl.
CPC .............. *A01K 83/06* (2013.01); *A01K 91/06* (2013.01)

(58) Field of Classification Search
CPC ......... A01K 83/06; A01K 97/04; A01K 91/06
See application file for complete search history.

(56) References Cited

U.S. PATENT DOCUMENTS

| 933,818 | A | * | 9/1909 | Beatty | A01K 83/06 43/41 |
| 1,489,156 | A | * | 4/1924 | Russell | A01K 83/06 43/41 |
| 2,608,789 | A | | 2/1948 | Stone | |
| 2,454,879 | A | * | 11/1948 | Mattingly | A01K 83/06 43/44.8 |
| 2,564,216 | A | | 11/1948 | Stark | |
| 2,518,593 | A | * | 8/1950 | Bell | A01K 83/06 43/44.2 |
| 2,719,379 | A | * | 10/1955 | Fritts | A01K 83/06 43/44.6 |
| 3,399,483 | A | | 9/1968 | Naffziger | |

(Continued)

FOREIGN PATENT DOCUMENTS

GB 2471341 A 12/2010

OTHER PUBLICATIONS

PCT/US2012/055080 International Search Report/Written Opinion dated Dec. 7, 2012.

*Primary Examiner* — Jessica B Wong
(74) *Attorney, Agent, or Firm* — Edwin S. Flores; Daniel J. Chalker; Chalker Flores, LLP

(57) ABSTRACT

The present invention includes a fishing bait holder, the holder including: a hollow tubular housing, the housing having a first closed end and a second open end, the first closed end having on the top of the exterior an orifice for attaching a fishing line; a rod for holding a plurality of pieces of bait, the rod having a first end and a second end, the first coupled to the interior of the first closed end of the hollow tubular housing, and the second end culminating in a fish hook; a spring encircling the rod; and a washer encircling the rod and inferior to the spring, proximal to the hook.

8 Claims, 6 Drawing Sheets

(56) References Cited

U.S. PATENT DOCUMENTS

| | | |
|---|---|---|
| 3,400,483 A | 9/1968 | Temple |
| 3,643,366 A | 2/1972 | Gates |
| 4,015,359 A | 4/1977 | Andrews |
| 4,047,320 A | 9/1977 | Lee |
| 4,428,146 A | 1/1984 | Walker |
| 4,760,665 A | 8/1988 | Stueber |
| 4,934,092 A | 6/1990 | Simmons et al. |
| 5,067,270 A | 11/1991 | Garrick |
| 5,117,571 A | 6/1992 | Sites |
| 5,274,947 A * | 1/1994 | Griffiths ............... A01K 83/06 43/44.2 |
| 5,377,445 A | 1/1995 | Brannon |
| 5,548,920 A | 8/1996 | Peddycoart |
| 5,832,655 A * | 11/1998 | Crumrine ............... A01K 85/00 43/42.39 |
| 6,012,247 A | 1/2000 | Kinsey |
| 6,138,400 A | 10/2000 | Gervae |
| 6,421,951 B1 | 7/2002 | Kuhl |
| 6,425,200 B1 | 7/2002 | Bennis |
| 6,438,892 B1 | 8/2002 | Oberman et al. |
| 6,625,920 B1 | 9/2003 | Rockwell |
| 8,161,678 B1 | 4/2012 | DeLucca |
| 9,839,209 B2 * | 12/2017 | Nelson, Jr. ............. A01K 97/04 |
| 2004/0016171 A1 | 1/2004 | Waxmanski |
| 2004/0093784 A1 | 5/2004 | Brahm et al. |
| 2005/0172538 A1 * | 8/2005 | Brinkman ............. A01K 83/06 43/42.36 |
| 2006/0016118 A1 | 1/2006 | Zuk |
| 2011/0041381 A1 | 2/2011 | Houghton |
| 2012/0042468 A1 | 2/2012 | Viles |
| 2017/0094958 A1 * | 4/2017 | Steiginga ............... A01K 83/06 |
| 2017/0094959 A1 * | 4/2017 | Steiginga ............... A01K 99/00 |

* cited by examiner

SELF DISPENSING BAIT HOLDER

CROSS REFERENCE TO RELATED APPLICATIONS

This application claims the benefit of PCT/US2012/0055080 filed Sep. 13, 2012, which claimed priority to provisional patent application 61/542,450 filed Oct. 3, 2011 by the present inventor and these applications are hereto incorporated by reference in their entirety.

BACKGROUND OF THE INVENTION

1. Field of the Invention

The disclosed relates generally to devices for holding and dispensing fish bait via a hook to catch the fish. More specifically, it relates to a device capable of storing multiple pieces of bait and dispensing each piece as needed to the fish hook.

2. Description of Related Art

The general concept is that it is time-consuming and inefficient tore-bait one's fishing hook every time a fish nibbles the bait off or the bait falls off in the water. With regard to dough bait or other types of bottom feeder bait, it is common for the bait to crumble off into the water or to be gently nibbled off by the fish. As a result, the fisherman must continually pull the fishing line in to check the status of the bait on the hook. This frequent disruption in the line placement decreases the likelihood of a fish biting, not to mention the process is tedious and frustrating. There appear to be no prior art references related to a device capable of storing multiple pieces of bait and self-dispensing each piece as needed to the fish hook, without the need for further intervention by the fisherman.

There is a need for a practical method and device such that a fisherman can avoid tedious and repetitive pulling in of the fishing line to check the status of and, if necessary, rebait the hook during fishing sessions. Such a method and device needs to be quick and easy to load bait on, sturdy enough to withstand the effects of fish and water, able to protect the multiple pieces of bait until needed and in a size and shape conducive to attracting and catching fish.

SUMMARY OF THE INVENTION

In accordance with the present invention, a device and method is disclosed for storing multiple pieces of fish bait and dispensing them on an as needed basis without further human intervention.

An objective of the disclosure is a device and method that prevents a fisherman from repetitively having to pull the fishing line in to check bait.

An objective of the disclosure is a device and method to enable a fisherman to leave his baited hook in the water continually, in order to improve odds of catching a fish.

An objective of the disclosure is a device and method for improving the odds of a fish biting the hook.

An objective of the disclosure is a device and method that releases an increased amount of scent to attract fish.

An objective of the disclosure is a bait holder to make it easier and less messy to bait a fishhook.

An objective of the disclosure is a bait holder that makes it less likely the bait will fall off in the water.

An objective of the disclosure is a bait holder that stores and protects multiple pieces of bait.

An objective of the disclosure is a bait holder that automatically dispenses fish bait to the hook as needed.

An objective of the disclosure is a novel fishhook, the fishhook having an elongated rod wherein the bait can be slid down over the top of the rod, rather than hooked onto or molded around the hook.

An objective of the disclosure is a fishing bait holder, the holder comprising:

a rod for holding a plurality of pieces of bait, the rod having a first and second end, the first end being threaded and the second end culminating in a fish hook; a washer through which the rod travels, the washer superior to the hook and to the loaded bait; a spring proximal to the washer and encircling the rod; a hollow cylindrical housing over the spring, the housing having a first closed end and a second open end, the first end having on the top of the exterior an orifice for attaching a fishing line and internally housing a nut into which the first end of the rod threads, the fishhook protruding out of the second open end.

An objective of the disclosure is a fishing bait holder, the holder comprising:

a spring release bait holder for holding a plurality of pieces of bait on a rod, the holder having a rod with a first end that is threaded and a second end culminating in a hook, the spring encircling the rod and deploying a new bait to the hook each time a bait on the hook is removed; a housing for protecting the multiple pieces of bait; a connector for securing the rod to the housing.

An objective of the disclosure is a fishing bait dispenser, the dispenser comprising: a spring loaded rod holding a plurality of pieces of fish bait and self-dispensing one at a time to a treble hook at one end of the rod; a housing having a first closed end and second open end, the housing surrounding the spring loaded rod superior to the hook; a connector securing the rod to the interior of the first closed end of the housing.

In some embodiments of the disclosure, a fishing bait holder is disclosed as including a hollow tubular housing, the housing having a first closed end and a second open end, the first closed end having on the top of the exterior an orifice for attaching a fishing line; a rod for holding a plurality of pieces of bait, the rod having a first end and a second end, the first end coupled to the interior of the first closed end of the hollow tubular housing, and the second end culminating in a fish hook; a spring encircling the rod; and a washer encircling the rod and inferior to the spring, proximal to the hook. In some aspects, the first end of the rod is non-detachably coupled to the interior of the first closed end of the hollow tubular housing. In some aspects, the first end of the rod is detachably coupled to the interior of the first closed end of the hollow tubular housing. In some aspects, the bait holder further includes a connector securing the rod to the interior of the first closed end of the hollow tubular housing. In some aspects, the hollow tubular housing has a substantially circular or polygonal cross-section. In some aspects, the fish hook is non-detachably coupled to the second end of the rod. In some aspects, the fish hook is detachably coupled to the second end of the rod. In some aspects, the hook is a single fish hook or a treble fish hook. In some aspects, the bait is dough bait, shrimp, or corn.

In some embodiments of the disclosure, a fishing bait holder is disclosed as including a spring release bait holder for holding a plurality of pieces of bait on a rod, the holder having a rod with a first end coupled to an interior of the holder and a second end culminating in a hook, a spring encircling the rod and deploying new bait to the hook each time a bait on the hook is removed; and a housing protecting the plurality of pieces of bait. In some aspects, the rod is detachably coupled to the interior of the holder, and further comprising a connector to secure the rod to the holder. In some aspects, the rod is non-detachably coupled to the interior of the holder. In some aspects, the holder has a substantially circular or polygonal cross-section. In some aspects, the hook is non-detachably coupled to the second end of the rod. In some aspects, the hook is detachably coupled to the second end of the rod. In some aspects, the hook is a single fish hook or a treble fish hook. In some aspects, the bait is dough bait, shrimp, or corn.

In some embodiments of the disclosure, a fishing bait dispenser is disclosed as including a spring-loaded rod holding a plurality of pieces of fish bait and self-dispensing one piece of bait at a time to a hook at one end of the rod; and a housing having a first closed end and a second open end, the housing surrounding the spring-loaded rod superior to the hook. In some aspects, the dispenser further includes a washer encircling the spring-loaded rod superior to the plurality of pieces of fish bait. In some aspects, the dispenser further includes an orifice at the top of the housing for attaching a fishing line. In some aspects, the rod is detachably coupled to the housing, and further comprising a connector for securing the rod to the housing. In some aspects, the rod is non-detachably coupled to the housing. In some aspects, the housing has a substantially circular or polygonal cross-section. In some aspects, the hook is non-detachably coupled to the second end of the rod. In some aspects, the hook is detachably coupled to the second end of the rod. In some aspects, the hook is a single fish hook or a treble fish hook. In some aspects, the bait is dough bait, shrimp, or corn.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

The figures constitute a part of this specification and include exemplary embodiments to the invention, which may be embodied in various forms. It is to be understood that in some instances various aspects of the invention may be shown exaggerated or enlarged to facilitate an understanding of the invention. To enable more thorough understanding of the features and advantages of the present invention, reference is now made to the detailed description of the invention along with the accompanying figures in which:

FIG. 1a is a front view of the housing, in the preferred embodiment.

DETAILED DESCRIPTION OF THE INVENTION

Figure 1:
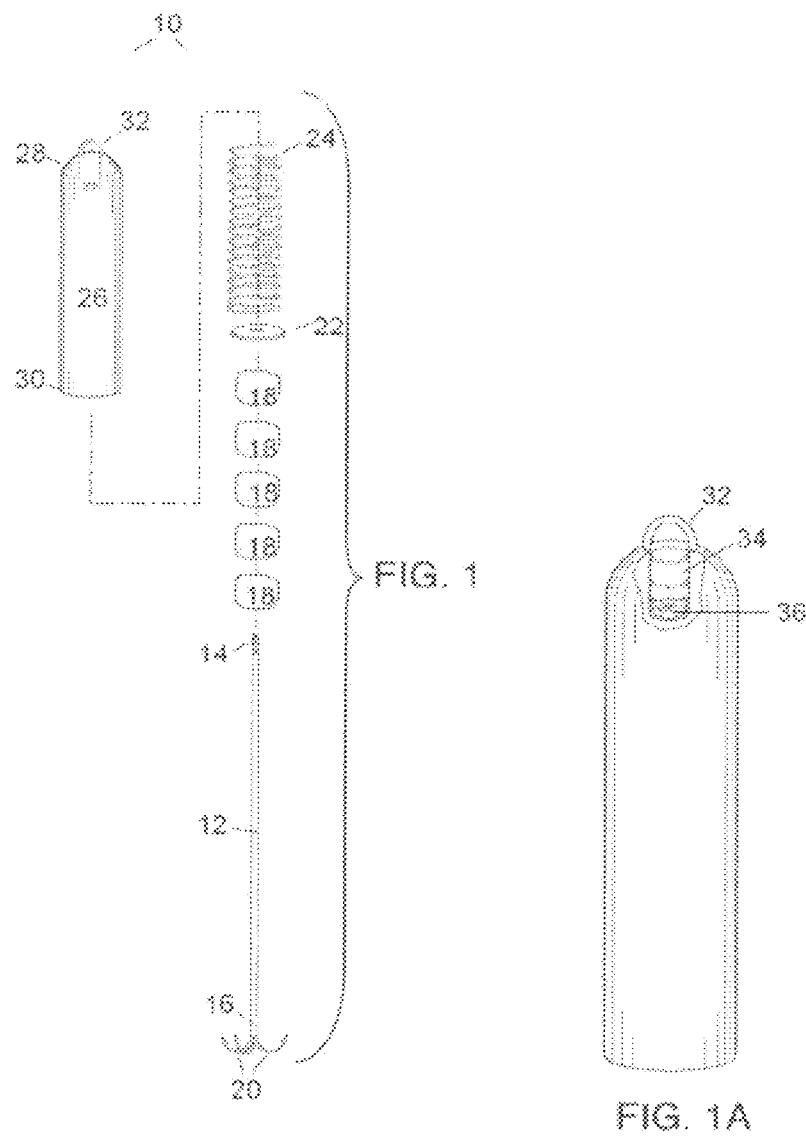
FIG. 1 is a front exploded view of the components of the disclosed fishhook, in the preferred embodiment, the bait being shown in its state prior to being loaded.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The disclosed enables a fisherman to preload the bait holder with multiple servings of bait. This fishhook resides at the bottom end of an elongated center rod which is preloaded with multiple servings of bait. The center rod is surrounded by a housing that protects the preloaded bait until time for use. The device is designed such that as the piece of bait lowest on the hook is removed, the next piece of bait self-dispenses by sliding down the center rod into place, for ready access by fish. The bait may be predrilled with a hole for easily loading onto the top end of the center rod, however this is not necessary if the dimension of the rod is small enough that it can easily slide through the bait without causing it to fall apart. The rod in the preferred embodiment is a #6 diameter (approximately 0.138" diameter) although it may be of varying sizes provided the same objectives described herein are accomplished. The device and method is intended to be used with treble hooks, such as those used when fishing for catfish and other large mouth bottom dwellers, but may be incorporated for use with other types of hooks, such as a single hook especially for use with live bait such as shrimp.

Historically, when using treble hooks for large mouth fish, the fisherman forms a dough ball around the shank of the hook, working it down closer to the bend of the three hooks. This method has been traditionally problematic as pieces of the hard dough bait easily crumble off in the water after the dough bait is molded it onto the hook. Once the dough ball falls off or is nibbled off by the fish, the fisherman must reel the line in and rebait. Even worse, the fisherman has previously had no way of knowing when the dough ball has actually fallen off and consequently may have his line in the water for a great length of time with no bait on the hook. The need to frequently pull the line in and check the bait means less time that the baited hook is in the water, and a lesser chance that a fish will be caught. In tournament settings, time is of the essence, and having to continually pull a line in to check and rebait can be hugely detrimental. Additionally, the repetitive motion of reeling the line in and recasting may scare the nearby fish away.

The disclosed device and method solves this problem. There are significant advantages to a device that enables the fisherman to cast once and then leave the baited hook in one area of the water for an extended period of time. One unforeseen advantage of the disclosed fish hook is that the self dispensing aspect encourages a nibbling fish to continue nibbling on and around the hook, even after the first piece of bait has fallen off or been nibbled away. The longer a fish stays in the vicinity of the hook, the higher the odds that it will bite and be caught.

Because of the necessity of a housing to protect the surplus bait prior to each piece self-dispensing downwardly to the hook, additional surprising advantages are gained. The ability of the device to store a large amount of bait results in a greater volume of bait scent being released into the surrounding water, further enticing nearby fish. In an embodiment, the housing may have small holes drilled in the side of the housing cylinder to more dramatically release the bait smell.

Turning to the illustrations, as exhibited in FIG. 1, in a preferred embodiment, the disclosed device 10 is pictured in an exploded view in order that the components and bait may be readily viewed. Pictured is a vertical elongated center rod 12 having a top end 14 and a bottom end 16, the rod 12 having the purpose of holding a plurality of pieces of bait 18. The fishhook 20, here shown as a treble hook, is located at the bottom end 16 of the center rod 12. The fishhook is novel in that it incorporates the elongated vertical rod and that it does not have the traditionally known eyehole at the top that the fishing line would thread through. The rod 12 and the fishhook 20 may be a one piece component or the fishhook 20 may be permanently or removably affixed to the bottom end 16 of the rod 12.

In practice, the bait 18 is loaded onto the rod 12 by the fisherman, by sliding the center point of each piece of bait 18 over the top end 14 of the rod 12. Next, the washer 22 slides over the top end 14 of the rod 12 and rests on the top most piece of bait 18. The spring 24 next is dropped down over the top end 14 of the rod 12 and sits superior to the washer 22. A hollow cylindrical housing 26 having a closed first end 28 and an open second end 30 next slides over the spring 24, washer 22 and pre-loaded bait 18, protecting the bait. In the preferred embodiment, the fish hook 20 itself is not covered by the housing, rather extending below the housing 26 to enable the fish hook 20 and at least one piece of bait 18 to be accessible, outside of the housing 26, to a biting fish.

Projecting from the exterior of the closed first end 28 of the housing 26 is an arch 32 or an orifice through which a fishing line may be tied to secure the device 10 to the line.

FIG. 1a provides a cutaway of the interior of the closed first end 28 of the housing 26 showing a hollow cylinder 34 having inside it a barrel nut 36.

In practice the top end 14 of the rod 12 is threaded. After pre-loading the pieces of bait on the rod and dropping the washer, spring and housing over the rod, the fisherman would next insert the threaded top end 14 of the rod 12 into the barrel nut 36, turning the fish hook or the rod until the top end 14 of the rod 12 is securely screwed into the barrel nut 36, which holds the spring loaded rod assembly and bait securely in the protective housing 26.

The fisherman would next pass one end of his fishing line through the arch 32 or orifice on the exterior of the closed first end 28 of the housing 26 and tie it securely, prior to casting out his line to commence fishing.

Figure 2:
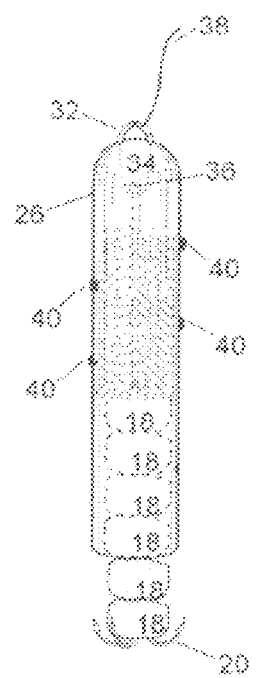
FIG. 2 is a close up perspective view of the disclosed fishhook in the preferred embodiment, with the bait pre-loaded.

In FIG. 2, is a close up perspective view of the device 10 assembled as described above, revealing the interior components in phantom. FIG. 2 reveals the fishing line 38 tied to the arch 32. FIG. 2 also reveals the embodiment of a plurality of drilled holes 40 in the housing 26, above the washer 22, in order to encourage the device 10 to take on water such that it will sink easier. The holes may also release more of the bait scent out to surrounding fish and entice them closer, especially if additional holes are drilled below the washer.

Figure 3:
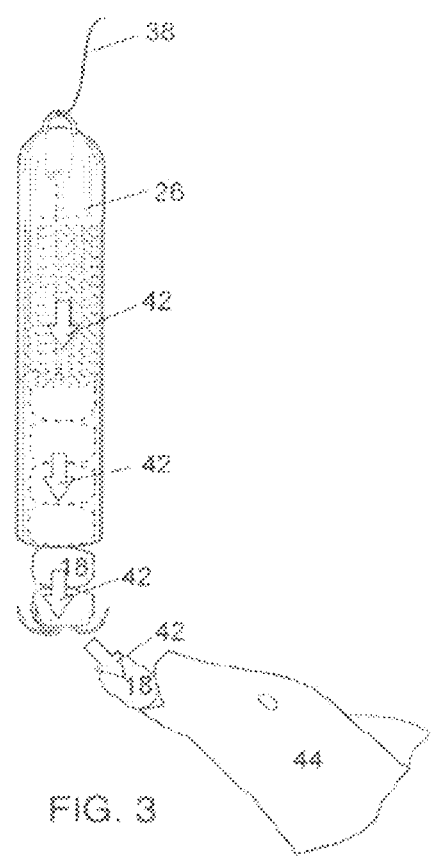
FIG. 3 is a close up perspective view of the disclosed fishhook, in the preferred embodiment, showing the dispensing action.

FIG. 3 depicts the same view as FIG. 2 however FIG. 3 also depicts the self-dispensing action 42 of the device 10 as effectuated in the water. The bait 18 is preloaded onto the rod 12 with the bottom most piece being held by the treble hook 20. The remaining pieces are stacked atop one another on the rod 12. Above the last piece of bait rests the washer 22, above which presses down the spring 24 which has been compacted upwards by the loading of the bait 18. Because the spring 24 is compacted due to the plurality of pieces of pre-loaded bait 18 pushing it upwards, after the bottom most piece of bait falls or is eaten off by a fish 44, the next piece of bait is pushed down by the spring 24, into place on the treble hook 20, and so forth, until all of the bait 18 has been dispensed or a fish has been caught, whichever occurs first.

Figure 4:
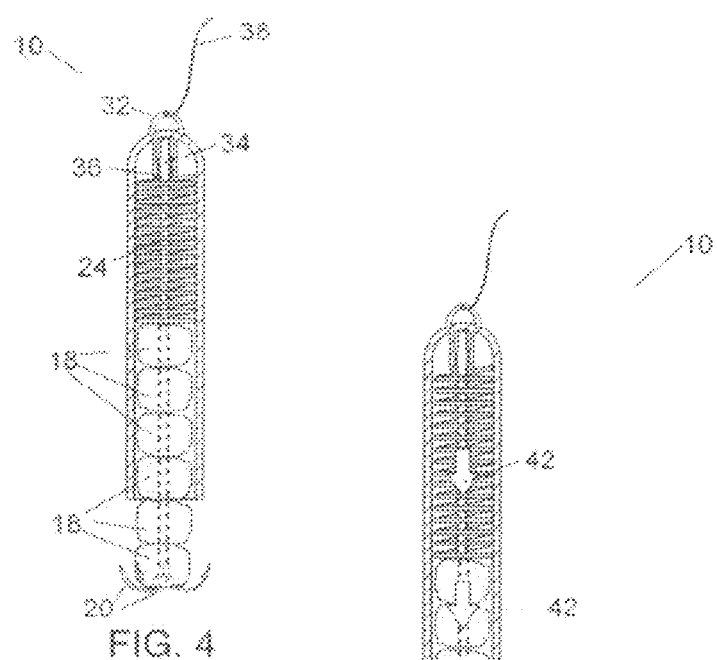
FIG. 4 is a close up sectional view of the disclosed fishhook, in the preferred embodiment, with the bait preloaded.

FIG. 4 depicts a sectional view of the device 10, showing more clearly the interior components of the device 10 with the housing protecting the majority of the bait 18 and spring 24 while the fish hook 20 projects down below and outside of the open second end 30 of the housing 26.

Figure 5:
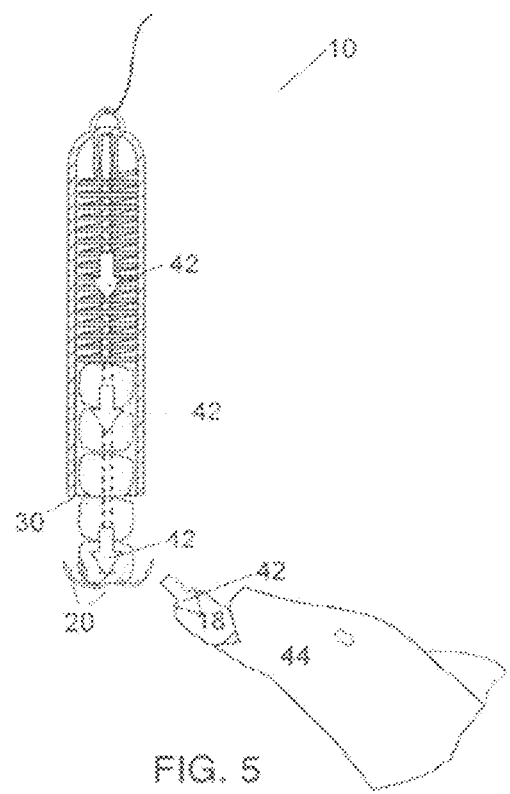
FIG. 5 is a close up sectional view of the disclosed fishhook, in its preferred embodiment, showing the dispensing action.

FIG. 5 depicts a sectional view of the device 10, showing more clearly the interior components of the device 10 and the dispensing action of the self-dispensing bait.

Figure 6:
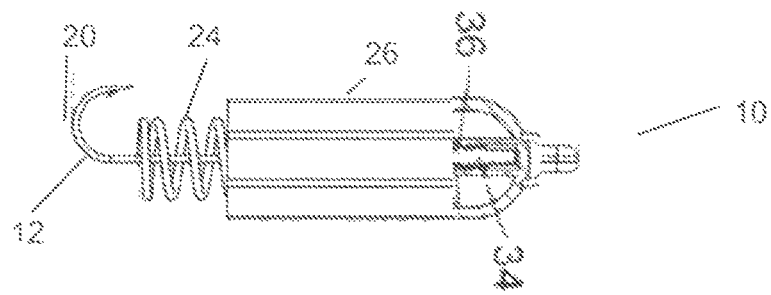
FIG. 6 is a side view of an embodiment of the device.

FIG. 6 depicts a side view of an embodiment of the device 10, showing the housing 26, the spring 24, and a single fishhook 20. In this illustration, the housing 26 is shown as octagonal in cross-section. This is a non-limiting example; the housing 26 can be substantially circular in cross section or polygonal in cross-section, including triangular, square, rectangular, pentagonal, hexagonal, octagonal, or other polygonal shapes. In an embodiment of the present invention, the rod 12 is detachably coupled to the housing 26 and a connector (e.g., hollow cylinder 34 containing barrel nut 36) is used to secure the rod 12 to the housing 26. In another embodiment, the rod 12 is non-detachably coupled to the housing 26. In another embodiment, the fishhook 20 is detachably coupled to the rod. In another embodiment, the fishhook 20 is non-detachably coupled to the rod. A single fishhook 20 is shown as a non-limiting example. In one embodiment, the fishhook 20 is a single hook, but it can be another type of hook such as a treble fishhook. Further, the present invention can use as bait dough bait, shrimp, corn or other types of bait, including smaller types of bait.

Figure 7:
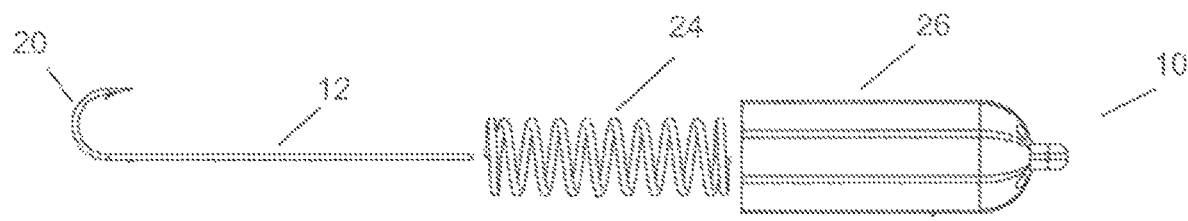
FIG. 7 is an exploded side view of an embodiment of the device.

FIG. 7 shows an exploded view of an embodiment of the device 10, showing the housing 26, and showing more clearly the spring 24, the fishhook 20, and the rod 12.

Figure 8:
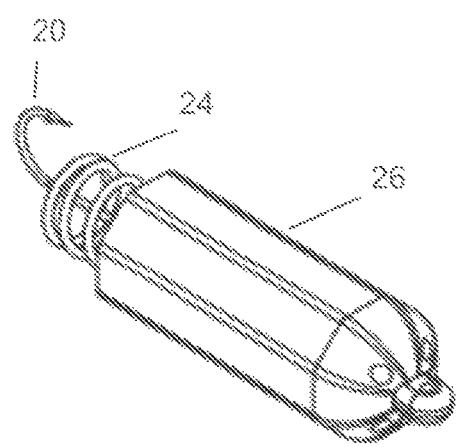
FIG. 8 is a perspective view of an embodiment of the device.

FIG. 8 is a perspective view of an embodiment of the device 10 with an octagonal housing 26 and a single fishhook 20.

Figure 9:
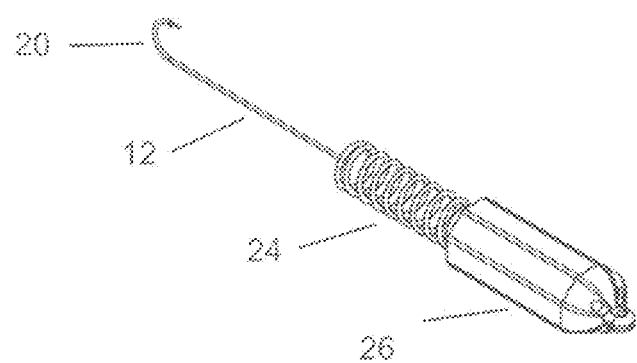
FIG. 9 is an exploded perspective view of an embodiment of the device.

FIG. 9 is an exploded perspective view of that embodiment of the device 10, showing more clearly the spring 24, the fishhook 20, and the rod 12.

Figure 10:
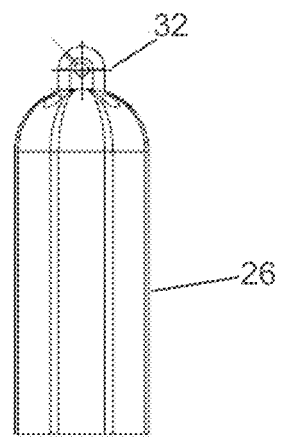
FIG. 10 is a side view of a housing of embodiment of the device.

FIG. 10 is a side view of the housing of an embodiment of the device 10. In the embodiment illustrated, there is an arch or and orifice 32 at the top of the housing 26 to which a fishing line can be attached.

In some embodiments, an additional benefit of the disclosed is that the device is much easier and less messy to bait with dough bait, than a traditional fishhook. Typically the way one places dough bait on a fish hook is to carefully mold the bait around and onto the hook with one's hands. There are numerous disadvantages with this method. One, it is difficult to mold the hard dough bait onto the hook. Two, the bait can easily fall off once it is molded on. Three, it is messy. Four, the user could easily injure themselves by having to use their bare hand to push the bait onto and around a treble or single hook.

Some embodiments of the disclosed device are loaded by merely sliding each piece of bait from the top downwardly on the elongated center rod, preventing the user from needing to physically mold the bait onto the hook. Once the bait has dropped down to the hook, it sits more securely, as it is held inside or on the tines of the hook rather than being molded around the outside of the hook. It is less likely to fall off in the water. It is safer, easier and less messy to bait the hook.

The way traditional fishhooks are made, there is no way to slide bait over the top of them as the top of the fishhook typically has a wide eyehole through which the fishing line threads. The eyehole is too wide to push a piece of bait over. The disclosed is novel in that the fishhook rod itself has no built in eye at the top, and therefore a piece of bait can be slid downwardly from the top of the rod, rather than to be molded over or hooked onto the fishhook itself.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A fishing bait holder, the holder comprising:
a spring release for holding a plurality of pieces of bait on a rod, wherein the rod has a first end coupled to an interior of the holder and a second end culminating in a hook, and a spring encircling the rod and deploying new bait to the hook each time a bait on the hook is removed; wherein the holder protects the plurality of pieces of bait.

2. The fishing bait holder of claim 1, wherein the rod is detachably coupled to the interior of the holder, and further comprising a connector to secure the rod to the holder.

3. The fishing bait holder of claim 1, wherein the rod is non-detachably coupled to the interior of the holder.

4. The fishing bait holder of claim 1, wherein the holder has a substantially circular or polygonal cross-section.

5. The fishing bait holder of claim 1, wherein the hook is non-detachably coupled to the second end of the rod.

6. The fishing bait holder of claim 1, wherein the hook is detachably coupled from the holder.

7. The fishing bait holder of claim 1, wherein the hook is a single fish hook or a treble fish hook.

8. The fishing bait holder of claim 1, wherein the bait is dough bait, shrimp, or corn.

* * * * *